United States Patent [19]

Maaz

[11] Patent Number: 4,503,923

[45] Date of Patent: Mar. 12, 1985

[54] ELECTROMAGNETIC FORCE-COMPENSATING BALANCE

[75] Inventor: Günther Maaz, Uslar-Wiensen, Fed. Rep. of Germany

[73] Assignee: Sartorius GmbH, Fed. Rep. of Germany

[21] Appl. No.: 474,282

[22] Filed: Mar. 11, 1983

[30] Foreign Application Priority Data

Mar. 26, 1982 [DE] Fed. Rep. of Germany ....... 3211163

[51] Int. Cl.³ .......................... G01G 3/15; G01G 7/00
[52] U.S. Cl. ............................. 177/212; 177/210 EM
[58] Field of Search ..................... 177/210 EM, 212; 335/222, 306; 336/110, 130

[56] References Cited

U.S. PATENT DOCUMENTS

| 3,134,057 | 5/1964 | Tsunoo et al. | 335/306 X |
| 3,173,067 | 3/1965 | Wright | 335/306 X |
| 4,184,556 | 1/1980 | Kunz | 177/212 X |
| 4,283,698 | 8/1981 | Fujisawa | 335/306 |
| 4,382,480 | 5/1983 | Knothe et al. | 177/212 |

Primary Examiner—E. A. Goldberg
Assistant Examiner—Patrick W. Foster
Attorney, Agent, or Firm—Eric P. Schellin

[57] ABSTRACT

In an electromagnetic balance based on the principle of the eletromagnetic compensation of force a weight-proportional counterforce is generated by a current-carrying coil in a permanent magnet system. An arrangement with annular coil with vertical axis and with a permanent magnetic system constructed symmetrically to the central plane of the coil has proven to be advantageous. However, this arrangement results in a relatively great construction height of the balance. In order to decrease this height, the invention suggests that the soft iron pole plate which is usually present between the like poles of the plates of active magnetic material be reduced in its diameter or entirely eliminated and that the coil be allowed to extend into this area between the plates of active magnetic material. This in conjunction with the use of materials having high coercivity makes a very low constructional height possible.

9 Claims, 3 Drawing Figures

ELECTROMAGNETIC FORCE-COMPENSATING BALANCE

FIELD OF THE INVENTION

The invention concerns a balance based on the principle of the electromagnetic compensation of force with an annular carrier coil with a vertical axis, and with a permanent magnet system which is basically constructed symmetrically to the central plane of the carrier coil and contains a plate of active magnetic material with vertical direction of magnetization above and below this central plane, whereby the like poles of these plates face each other. Balances of this type are known, for example, from U.S. Pat. No. 4,034,819. This patent is incorporated by reference.

This arrangement has the advantage that a vertical compensation force results directly and that the coil contributes fully to the production of force along its entire length. The symmetrical construction of the permanent magnet system offers in addition the advantage of a low feedback of the carrier coil on the magnetic field strength of the permanent magnet system, low hysteresis and good filterability against foreign magnetic fields. However, the great constructional height of the permanent magnet system, which causes the entire balance to become very high, is disadvantageous. Even the use of magnetic materials with high coercivity field strengths (e.g. materials based on samarium-cobalt alloys) could not reduce this constructional height to the desired level, because the reduced thickness of the plates of active magnetic material leads, given unchanged air gap geometry, to a sharp increase of the leakage flux due to the spatial proximity of the low-retentivity magnetic return paths.

BRIEF DESCRIPTION OF THE INVENTION

The invention therefore has the task of improving a balance of the type indicated above so that when magnetic materials with a high coercivity are used, there is a low constructional height of the permanent magnet system without the magnetic leakage losses increasing too sharply.

The invention achieves this goal as follows: The inside diameter of the carrier coil is smaller than the greatest diagonal of the plates of active magnetic material.

Thus, the function of the usually present soft iron pole plate of gathering and guiding field lines is partially or entirely dispensed with; instead, the carrier coil also extends into the area between the two plates of active magnetic material.

DESCRIPTION OF THE DRAWINGS

The invention is described below with reference made to the schematic drawings.

DETAILED DESCRIPTION OF THE INVENTION

Figure 1:
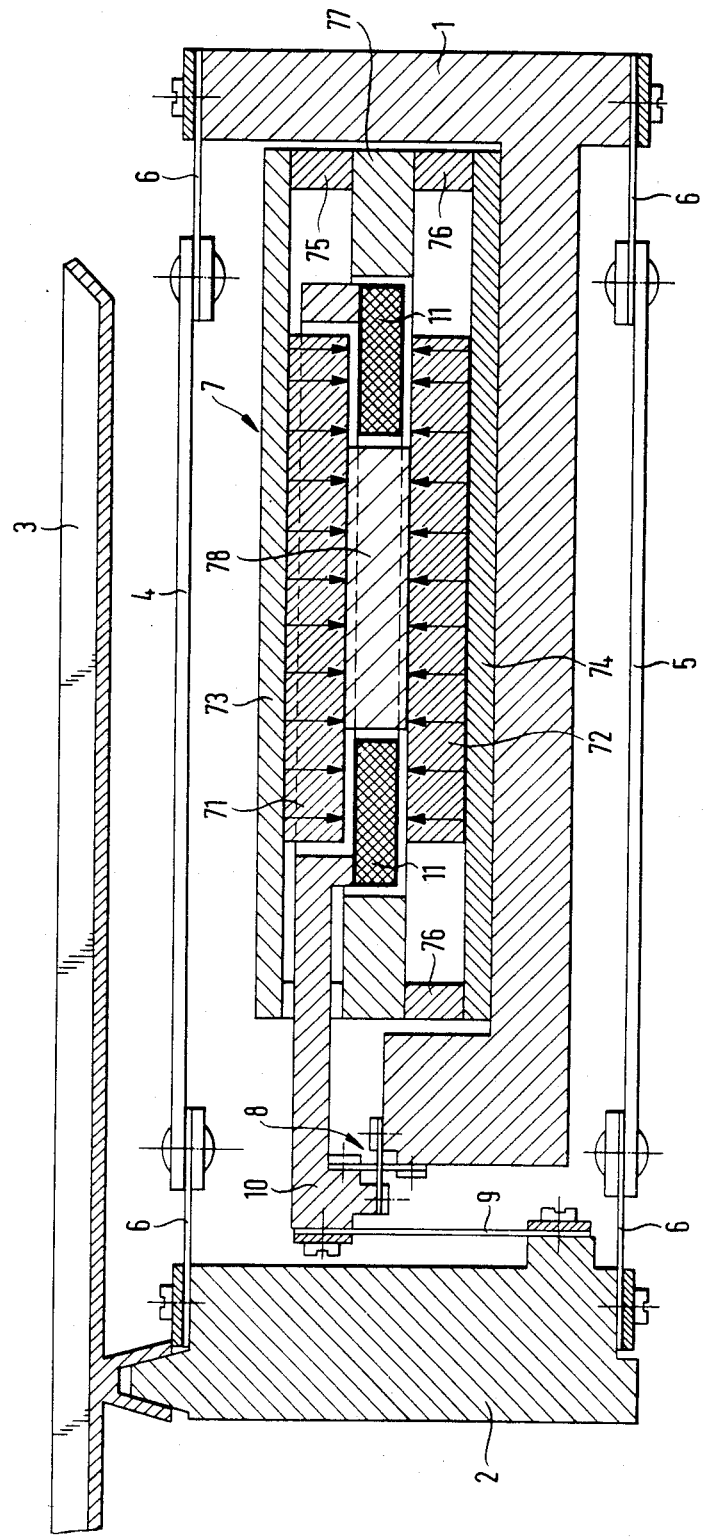
FIG. 1 shows the essential parts of the balance in section.

The electromagnetic force-compensating balance in FIG. 1 consists of a support part 1 which is fixed to the housing and to which a load receiver 2 is attached in a vertically movable manner over two guide rods 4 and 5 with articulation points 6. The load receiver carries load pan 3 for receiving the material to be weighed at its top and transfers the force corresponding to the mass of the material to be weighed over a coupling element in the form of a thin tension band 9 to the shorter lever arm of transfer lever 10. Transfer lever 10 is mounted on support part 1 by cross spring joint 8. A coil 11 is fastened to the longer lever arm of transfer lever 10, which coil generates the electromagnetic compensation force in cooperation with permanent magnet system 7. The associated regulating electronics are not shown as they are generally known.

Permanent magnet system 7 consists of two disks 71 and 72 of active magnetic material with high coercivity field strength, e.g. made of a samarium-cobalt alloy and with one low-retentivity return path each. Both disks 71 and 72 of active magnetic material are magnetized vertically in opposite directions (indicated in the drawings by the direction of the arrows), so that their like poles face each other. The magnetic return path for upper disk 71 of active magnetic material is formed by upper plate 73, lateral pieces 75 and central plate 77. The magnetic return path for lower disk 72 of active magnetic material is formed in corresponding fashion by lower plate 74, lateral pieces 76 and central plate 77. The diameter of the hole in central plate 77 is made only a little larger than the diameter of disks 71 and 72 of active magnetic material in order to keep small the useful air gap length and likewise the leakage flux, e.g. from the lower polar surface of disk 71 directly through the air space to upper plate 73. Pole plate 78 between the two disks 71 and 72 of active magnetic material has a considerably smaller diameter than disks 71 and 72. Thus, this pole plate 78 collects only the magnetic field lines from the inner area of disks 71 and 72 of active material and allows them to exit radially from the surface of the pole plate. The magnetic field lines which exit further out from the polar surfaces are laterally displaced and guided toward the outside only by the repelling action of the opposite, like polar surface.

However, this strong demagnetizing tendency does not disturb on account of the high coercivity field strength of the active magnetic material used.

Carrier coil 11 extends inside the hole in central plate 77 far into the area between the two disks 71 and 72 of active magnetic material. This inner area does have a magnetic field strength which decreases toward the inside, but it can nevertheless supply a considerable portion of the electromagnetically generated force. Experience has shown that there is an optimum when the inner diameter of carrier coil 11 is approximately between 50 and 70% of the outer diameter of disks 71 and 72 of active magnetic material. Carrier coil 11 is fastened to the annularly shaped end of transfer lever 10.

Plates 73, 74 and 77 as well as pieces 75 and 76 are easy to punch out of metal sheeting, so that they are inexpensive to manufacture. The individual parts of the low-retentivity return path are connected by screws or rivets (not shown in FIG. 1).

The active magnetic material is preferably used in the form of round disks. However, it is also possible to use quadratic, hexagonal or octagonal plates of active magnetic material, which are easier to manufacture. The carrier coil can then be cylindrical, which results in a simple manufacture but not in an optimum utilization of the magnetic material. The carrier coil is adapted in its form to the form of the plates of active magnetic material, which increases the magnetic utilization but also the manufacturing cost. An individual optimization may be required here for each instance.

The low-retentivity return path 73–77 can also be round or rectangular or hexagonal or octagonal in its outer form without this changing its operation. Here too, the cost of material, manufacturing cost and special requirements must be considered on an individual basis.

Figure 2:
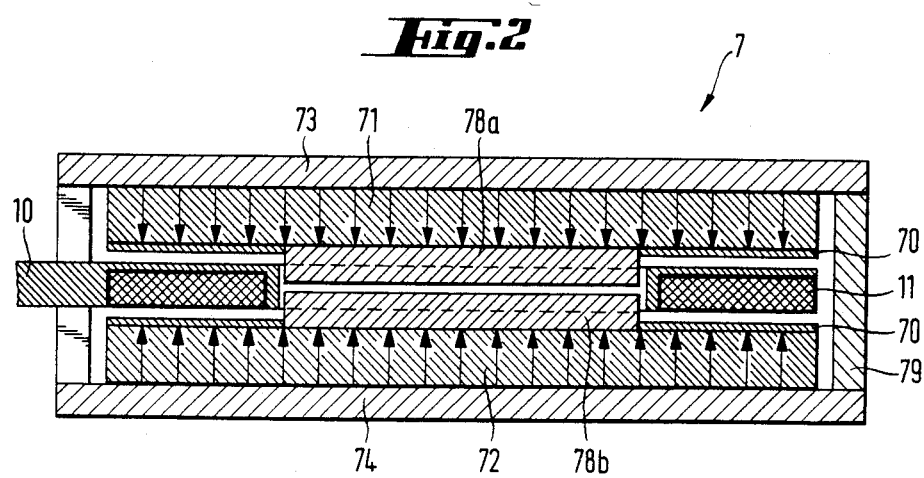
FIG. 2 shows another embodiment of the permanent magnet system and of the carrier coil of FIG. 1.

FIG. 2 shows another embodiment of permanent magnet system 7 and carrier coil 11. Round disks 71 and 72 of active magnetic material, which are magnetized vertically and in opposite directions, are fastened to the inside of upper plate 73 and of a lower plate 74 of soft iron. These two plates 73 and 74 are connected by soft iron tube 79, whereby the inside diameter of tube 79 is only slightly greater than the diameter of disks 71 and 72 of active magnetic material. Coil 11 is located entirely between the two disks 71 and 72 of active magnetic material and its outside diameter is approximately equal to the diameter of these disks 71 and 72. Coil 11 is fastened in a suitable opening at the end of transfer lever 10, which is mounted as in FIG. 1 to the support part fixed to the housing and is connected over coupling band 9 to the parallel guide construction.

The low-retentivity pole plate consists of two round disks 78a and 78b, whereby upper disk 78a is fastened to upper disk 71 of active magnetic material and lower disk 78b to lower disk 72 of active magnetic material. The division into two disks 78a and 78b, which is of course also possible in the embodiment according to FIG. 1, is used in order that thickness tolerances of these disks as well as of disks 71 and 72 of active magnetic material and the height tolerance of tube 79 can be absorbed during assembly by a more or less wide gap between disks 78a and 78b.

The magnetic field lines which exit as the lower polar surface of disk 71 of active magnetic material and at the upper polar surface of disk 72 of active magnetic material are reconcentrated, in part by pole plates 78a and 78b and displaced outward by the repelling action of the opposite like polar surface, pass through the area of coil 11 approximately horizontally and are guided back by tube 79 and soft-iron plates 73 and 74.

Low-retentivity pole plates 78a and 78b can of course be dispensed with entirely, if the coercivity force of disks 71 and 72 of active material is sufficient. In spite of the different air gap lengths for field lines from the inner area and the outer area of disks 71 and 72, the field line density inside disks 71 and 72 is to a considerable extent not place-dependent due to the high coercivity field strengtn.

Aside from pole plates 78a and 78b, thin sheets 70 of a material with a large temperature coefficient of saturation magnetizing are also provided on the facing poles of disks 71 and 72 of active magnetic material in FIG. 2. Such thin sheets are arranged in a known manner in a magnetic shunt and have the function of compensating the temperature of the permanent magnet system.

Figure 3:
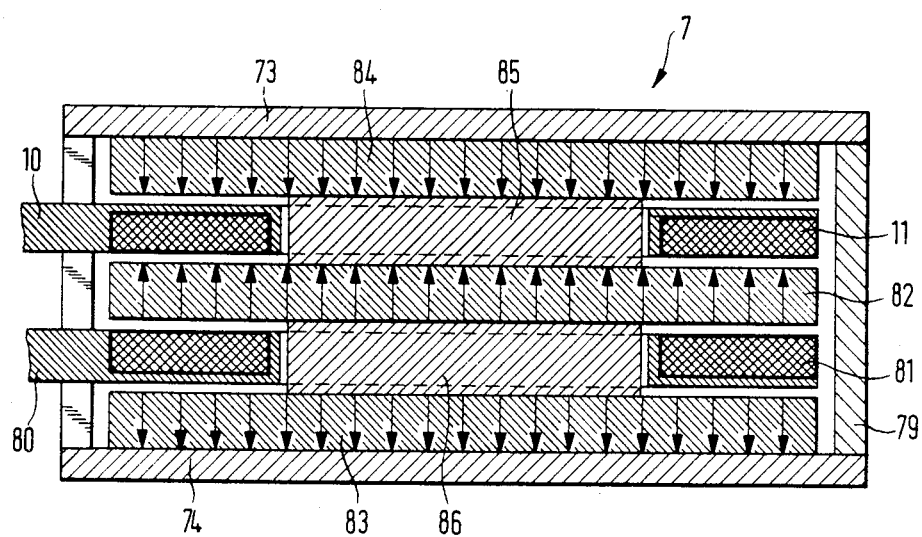
FIG. 3 shows the permanent magnet system in another embodiment which is especially constructed for the insertion of a second carrier coil.

FIG. 3 shows permanent magnet system 7 and two carrier coils 11 and 81 of another embodiment of the balance of the present invention. This embodiment is designed for a quotient measuring system which contains a second carrier coil operatively connected to a constant reference mass. Such quotient measuring systems are generally known and are described, for example, in DE Pat. No. 11 94 167, so that a detailed description of the entire structure and of the method of operation can be dispensed with here. The DE Pat. No. 11 94 167 is incorporated herein by reference.

The permanent magnet system of FIG. 3 contains three disks 82, 83 and 84 of active magnetic material. The direction of magnetization is indicated by the arrows. Small pole plates 85 and 86 of soft iron and the two coils 11 and 81 are located between these disks of active magnetic material. Upper plate 73, lower plate 74 and tube 79 form the outer, low-retentivity return path. The field lines of upper disk 84 of active magnetic material run partially through pole plate 85, then radially outward through coil 11 and then over the upper part of tube 79 and upper plate 73 as low-retentivity return path back to disk 84 of active magnetic material. The field lines of disk 82 of active magnetic material, which is magnetized in the opposite direction, run partially through pole plate 85, then radially outward through coil 11, through the central section of tube 79, through coil 81 and partially through pole plate 86 back into disk 82 of active magnetic material. The magnetic field lines of disk 83 of active magnetic material run through lower plate 74 and the lower part of tube 79, then radially inward through coil 81 and partially through pole plate 86 back into disk 83 of active magnetic material.

Coil 11 is again fastened to the end of transfer lever 10 and is thus connected to the load system. Correspondingly, coil 81 is fastened to a part 80 and is operatively connected over this part 80 to a reference system.

What is claimed is:

1. In a balance based on the principle of the electromagnetic compensation of force, comprising: at least one annular carrier coil having vertical axis, located in an air gap of a permanent essentially symmetrical magnet system positioned in a central plane of the carrier coil perpendicular to the vertical axis two disks of active magnetic material with vertical direction of magnetization above and below the central plane, whereby the like poles of these disks face each other so that a horizontal, radially running magnetic field is formed in the air gap in which the carrier coil is located, so that a vertical force is exerted on the carrier coil during current flux, the inside diameter of the carrier coil is smaller than the greatest diagonal of the disks of active magnetic material.

2. Balance according to claim 1, wherein the permanent magnet system has a pole plate of soft iron on the facing poles of the plates of active magnetic material, whereby the outside diameter of this pole plate is slightly less than the inside diameter of the annular carrier coil.

3. Balance according to claim 1, wherein the plates of active magnetic material have the form of round disks.

4. Balance according to claim 1, wherein the carrier coil is cylindrical.

5. Balance according to claim 4, wherein the outside diameter of the cylindrical carrier coil is approximately equal to the outside diameter of the disks of active magnetic material.

6. Balance according to claim 3, wherein the inside diameter of the cylindrical carrier coil is 50–70% of the outside diameter of the round disks of active magnetic material.

7. Balance according to claim 1, wherein the permanent magnet system consist of smooth parts punched out of metal sheets.

8. Balance according to claim 1, wherein a thin sheet made of a material with a large temperature coefficient of saturation magnetization is fastened to the free polar surface, which is not covered by a pole plate of the plates of active magnetic material.

9. Balance according to claim 1, wherein a second carrier coil of a reference weighing system is included, said second carrier coil has inside diameter smaller than the greatest diagonal of the plates of active magnetic material.

* * * * *